(12) United States Patent
Hayashi et al.

(10) Patent No.: US 10,236,752 B2
(45) Date of Patent: Mar. 19, 2019

(54) COIL SEGMENT MANUFACTURING APPARATUS

(71) Applicant: HONDA MOTOR CO., LTD., Tokyo (JP)

(72) Inventors: Kanomi Hayashi, Tochigi (JP); Shinichi Kawano, Tochigi (JP); Daisuke Ueno, Tochigi (JP); Satoru Saito, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/856,297

(22) Filed: Dec. 28, 2017

(65) Prior Publication Data

US 2018/0131260 A1 May 10, 2018

Related U.S. Application Data

(62) Division of application No. 14/465,381, filed on Aug. 21, 2014, now Pat. No. 9,876,413.

(30) Foreign Application Priority Data

Aug. 26, 2013 (JP) .................................. 2013-174945

(51) Int. Cl.
*B23P 19/00* (2006.01)
*H02K 15/04* (2006.01)

(52) U.S. Cl.
CPC .... *H02K 15/0421* (2013.01); *Y10T 29/49009* (2015.01); *Y10T 29/53143* (2015.01)

(58) Field of Classification Search
CPC .. H02K 15/0421; H01R 43/01; H02G 1/1256; Y10T 29/53143; Y10T 29/53213; Y10T 29/49009; Y10T 29/5121

USPC ................. 29/596, 33 M, 746, 749
See application file for complete search history.

(56) References Cited

U.S. PATENT DOCUMENTS

| 4,104,012 | A | | 8/1978 | Ferrante | |
|---|---|---|---|---|---|
| 4,235,015 | A | * | 11/1980 | Funcik | H01R 43/01 29/749 |
| 5,142,950 | A | | 9/1992 | Takano | |
| 5,343,605 | A | * | 9/1994 | Nazerian | H02G 1/1256 29/33 M |
| 6,314,780 | B1 | | 11/2001 | Naka | |
| 7,480,987 | B1 | | 1/2009 | Guercioni | |

FOREIGN PATENT DOCUMENTS

| CN | 101299557 | 11/2008 |
|---|---|---|
| JP | 2003-264964 | 9/2003 |
| JP | 3894004 | 12/2006 |
| JP | 2012-165624 | 8/2012 |

OTHER PUBLICATIONS

Chinese Office Action dated May 30, 2016, 7 pages.

* cited by examiner

*Primary Examiner* — Donghai D Nguyen
(74) *Attorney, Agent, or Firm* — Rankin, Hill & Clark LLP

(57) ABSTRACT

A coil segment manufacturing apparatus includes a conducting wire material feeder which repeatedly feeds a conducting wire material while changing the feeding amount and interposing a processing time, a coating remover which removes an insulation coating of the conducting wire material at a removal position each time the processing time is reached, and a conducting wire material cutter which cuts the conducting wire material each time the processing time is reached.

4 Claims, 5 Drawing Sheets

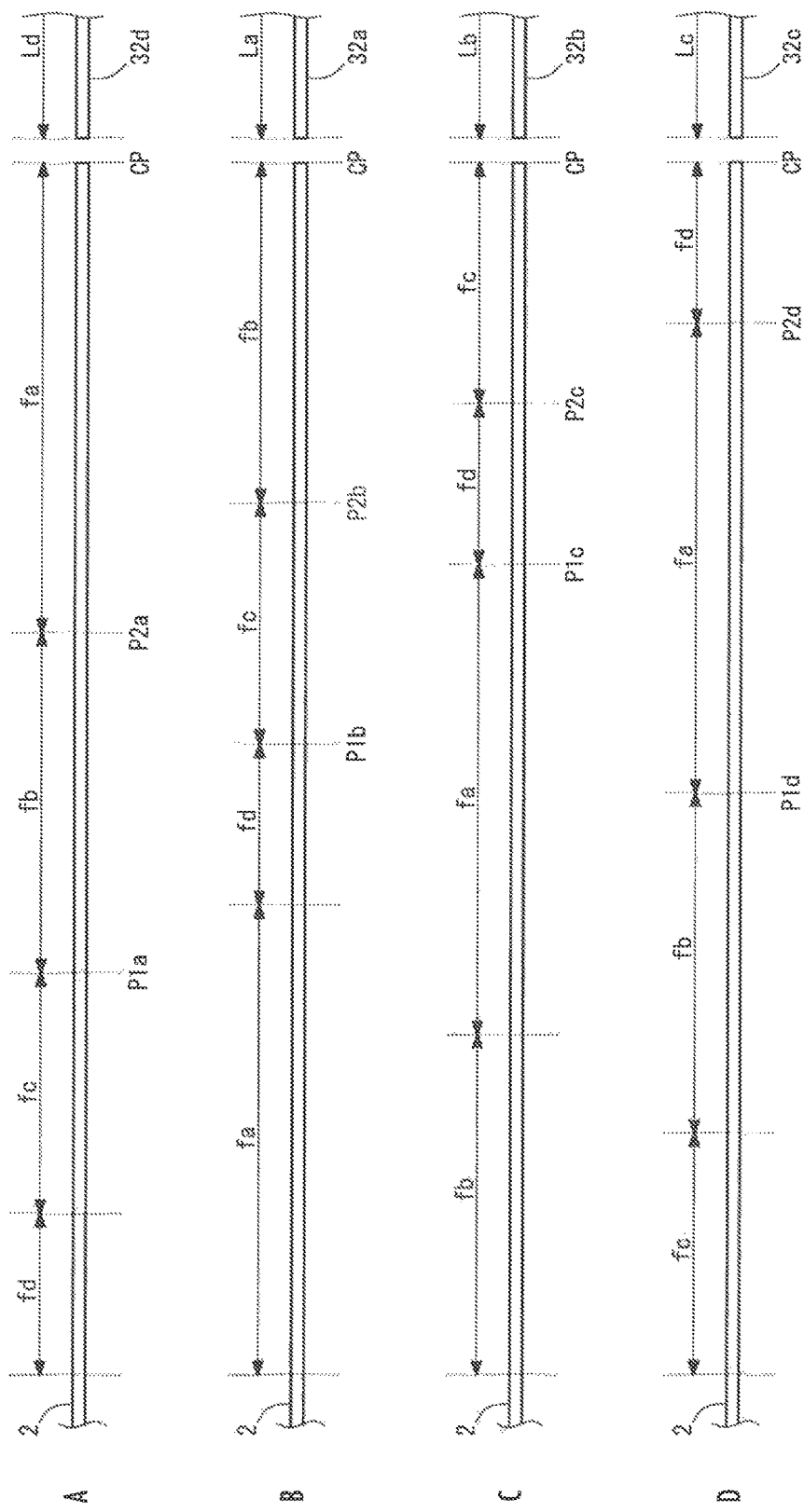

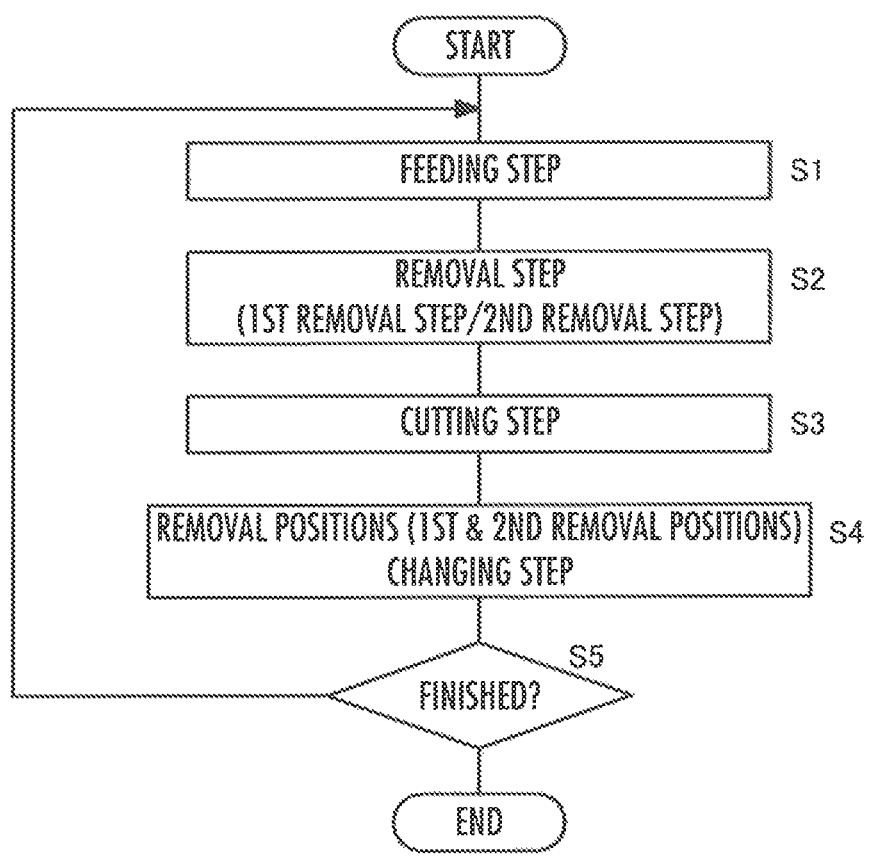

COIL SEGMENT MANUFACTURING APPARATUS

BACKGROUND OF THE INVENTION

1. Field of the Invention

The present invention relates to a coil segment manufacturing apparatus and a coil segment manufacturing method for manufacturing coil segments, which have a plurality of different lengths, and the insulation coatings of both ends of which have been removed, from a coil conducting wire material provided with an insulation coating.

2. Description of the Related Art

Conventionally, such coil segments are used to form a stator coil. To form the stator coil, a number of coil segments formed substantially into a U shape are arranged in an annular shape, the central portions of the U-shaped coil segments being overlapped, and both ends of the U-shaped coil segments are inserted into the slots of a stator core. Thus, the ends of each coil segment project from each slot. Then, the projecting ends of the coil segments are joined to constitute the stator coil (refer to, for example, Japanese Patent No. 3894004).

Further, a plurality of coil segments used in the form of a bundle have also been known (refer to Japanese Patent Application Laid-Open No. 2012-165624). Each bundle of the coil segments is formed into a U shape. A plurality of the formed coil segment bundles are annularly arranged such that they partly overlap, and both ends thereof are inserted into the slots of a stator core. The end portions of the coil segments that project from the slots are bent and joined to corresponding ends, thus constituting a stator coil.

To constitute the stator coil by using the foregoing coil segment bundles, the corresponding ends of the coil segments are joined. Therefore, when the coil segments constituting each bundle are inserted into the slots of the stator core, the portions that project from the slots are required to have the same length.

A possible method for obtaining the same length is to cut the ends of the bundled coil segments to the same length after the coil segments are formed into the bundle. However, the bundles of coil segments that have been formed are not linear, thus requiring a complicated apparatus for cutting the ends of the bundles to the same length. As a possible alternative method to obviate the need for using such a complicated apparatus, coil segments for constituting a bundle are set to different lengths beforehand such that the end portion of a bundle will be the same after the bundle is formed.

However, manufacturing a large volume of coil segments having different lengths would require that a cutting apparatus be used for each different length, meaning that separate apparatuses be used for different lengths, as well as an apparatus for gathering coil segments one by one of different lengths into a bundle. In addition, the processing by such an apparatus requires a certain time, leading to deteriorated manufacturing efficiency.

Further, both end portions of the coil segments must be in a state such that the insulation coatings are removed. This may be implemented by first removing the insulation coating of a portion of the conducting wire material that will be cut and then cutting the conducting wire material at the portion in the process of feeding and cutting the conducting wire material.

In this case, if the lengths of the coil segments are the same, then a feeding operation, in which the conducting wire material is fed by a predetermined feeding amount, is repeated, and the insulation coating is removed and the conducting wire material is cut at the same timing in synchronization with the repetition of the feeding operation. If, however, the lengths of the coil segments are different, then the removal of the insulation coating and the cutting of the conducting wire material have to be carried out at different timings while changing the feeding amount of the conducting wire material for each feeding operation. This leads to deteriorated production efficiency.

SUMMARY OF THE INVENTION

An object of the present invention is to provide a coil segment manufacturing apparatus and a coil segment manufacturing method that permit efficient manufacture of coil segments of a plurality of different lengths by a simple apparatus.

To this end, according to the present invention, there is provided a coil segment manufacturing apparatus for manufacturing coil segments, insulation coatings of both ends of which have been removed and which have a plurality of different lengths, from a coil conducting wire material provided with an insulation coating, including: a conducting wire material feeder which repeats a feeding operation to feed the conducting wire material by a predetermined feeding amount along a fixed feeding route while sequentially changing the feeding amount to a plurality of different feeding amounts corresponding to the plurality of different lengths for each feeding operation and also interposing a predetermined processing time between the feeding operations; a coating remover which removes the insulation coating of the conducting wire material at a removal position on the feeding route within the processing time each time the processing time is reached; a conducting wire material cutter which cuts the conducting wire material at a cutting position on the feeding route within the processing time each time the processing time is reached; and a removal position changer which changes the removal position in synchronization with the change of the feeding amount such that the insulation coating is removed at a portion that includes the position at which the cutting of the conducting wire material is carried out.

According to the present invention, the feeding amount is changed among the plurality of different feeding amounts and also the predetermined processing time is interposed while the conducting wire material is being fed. Then, each time the processing time is reached, the insulation coating of the conducting wire material is removed at the removal position and the conducting wire material is cut at the cutting position. At this time, the removal position is changed in synchronization with the change of the feeding amount of the conducting wire material such that the insulation coating is removed at a portion that includes the position at which the conducting wire material is cut.

Thus, coil segments can be manufactured by removing the insulation coating and cutting the conducting wire material at the same time for each feed of the conducting wire material by a single apparatus as with the case where the conducting wire material is fed by a fixed feeding amount and sequentially cut to manufacture coil segments of the same length. Hence, coil segments of a plurality of different lengths can be efficiently manufactured by an apparatus having a simple configuration.

According to the present invention, the conducting wire material may have a quadrangular cross section having a first side surface and a second side surface corresponding to one pair of opposite sides of the quadrangle and a third side surface and a fourth side surface corresponding to the other pair of opposite sides, the removal position may include a first removal position and a second removal position that is on a downstream side relative to the first removal position, the coating remover may be provided with a first remover which removes the insulation coating of the first side surface and the second side surface at the first removal position and a second remover which removes, at the second removal position, the insulation coating of the third side surface and the fourth side surface of the same portion as the portion of the conducting wire material, at which the insulation coating have been removed by the first remover, within the processing time that is different from the processing time for the removal of the insulation coating by the first remover.

This arrangement makes it possible to first remove the insulation coating from the first side surface and the second side surface by the first remover and feed the conducting wire material once by the conducting wire material feeder, and then remove the insulation coating from the third side surface and the fourth side surface by the second remover. Hence, the insulation coating can be removed by using a simple construction even in the case where, for example, a rectangular wire having a rectangular cross section is used as the conducting wire material.

The present invention provides a method for manufacturing coil segments, the insulation coatings of both ends of which have been removed and which have a plurality of different lengths, from a coil conducting wire material provided with an insulation coating, the method including: a step of repeating an operation for feeding the conducting wire material by a predetermined feeding amount along a fixed feeding route while sequentially changing the feeding amount to a plurality of different feeding amounts corresponding to the plurality of different lengths for each feeding operation and also interposing a predetermined processing time between the feeding operations; a removal step of removing the insulation coating of the conducting wire material at a removal position on the feeding route within the processing time each time the processing time is reached; and a cutting step of cutting a portion of the conducting wire material, at which the insulation coating has been removed in the removal step, at a cutting position on the feeding route within the processing time each time the processing time is reached, wherein the removal step and the cutting step are concurrently carried out.

With this arrangement, each time the processing time is reached, the removal step and the cutting step are concurrently carried out at the removal position and the cutting position, respectively, on the feeding route of the conducting wire material. Therefore, the coil segments having a plurality of different lengths can be efficiently manufactured on a single feeding route.

The manufacturing method according to the present invention may include a removal position changing step for changing the removal position in synchronization with the change of the feeding amount such that the insulation coating is removed at a portion that includes the position at which the conducting wire material is cut.

With this arrangement, merely changing the removal position in synchronization with the change of the feeding amount allows the conducting wire material to be cut at the portion where the insulation coating has been removed. This makes it possible to manufacture coil segments having a plurality of different lengths by a further simplified method.

In the coil segment manufacturing method according to the present invention, the conducting wire material may have a quadrangular cross section, a first side surface and a second side surface corresponding to one pair of opposite sides of the quadrangle and a third side surface and a fourth side surface corresponding to the other pair of opposite sides, the removal position may include a first removal position and a second removal position that is on a downstream side relative to the first removal position, and the removal step may include a first removal step of removing the insulation coating of the first side surface and the second side surface at the first removal position and a second removal step of removing, at the second removal position, the insulation coating of the third side surface and the fourth side surface of the same portion as the portion of the conducting wire material, at which the insulation coating has been removed by the first removal step, within the processing time that is different from the processing time for the removal of the insulation coating by the first removal step.

This arrangement makes it possible to first remove the insulation coating from the first side surface and the second side surface by the first removal step and feed the conducting wire material once by the feeding step, and then remove the insulation coating from the third side surface and the fourth side surface by the second removal step. Hence, the insulation coating can be removed by a simple method even in the case where, for example, a rectangular wire having a rectangular cross section is used as the conducting wire material.

BRIEF DESCRIPTION OF THE DRAWINGS

FIG. 4A is a diagram illustrating a first removal position P1a and a second removal position P2a immediately after the conducting wire material has been fed by a feeding amount fd in the coil segment manufacturing apparatus in FIG. 1;

FIG. 4B is a diagram illustrating a first removal position P1b and a second removal position P2b immediately after the conducting wire material has been fed by a feeding amount fa;

FIG. 4C is a diagram illustrating a first removal position P1c and a second removal position P2c immediately after the conducting wire material has been fed by a feeding amount fb;

FIG. 4D is a diagram illustrating a first removal position P1d and a second removal position P2d immediately after the conducting wire material has been fed by a feeding amount fc; and FIG. 5 is a flowchart illustrating the coil segment manufacturing process carried out by the coil segment manufacturing apparatus in FIG. 1.

DESCRIPTION OF THE PREFERRED EMBODIMENTS

Figure 1:
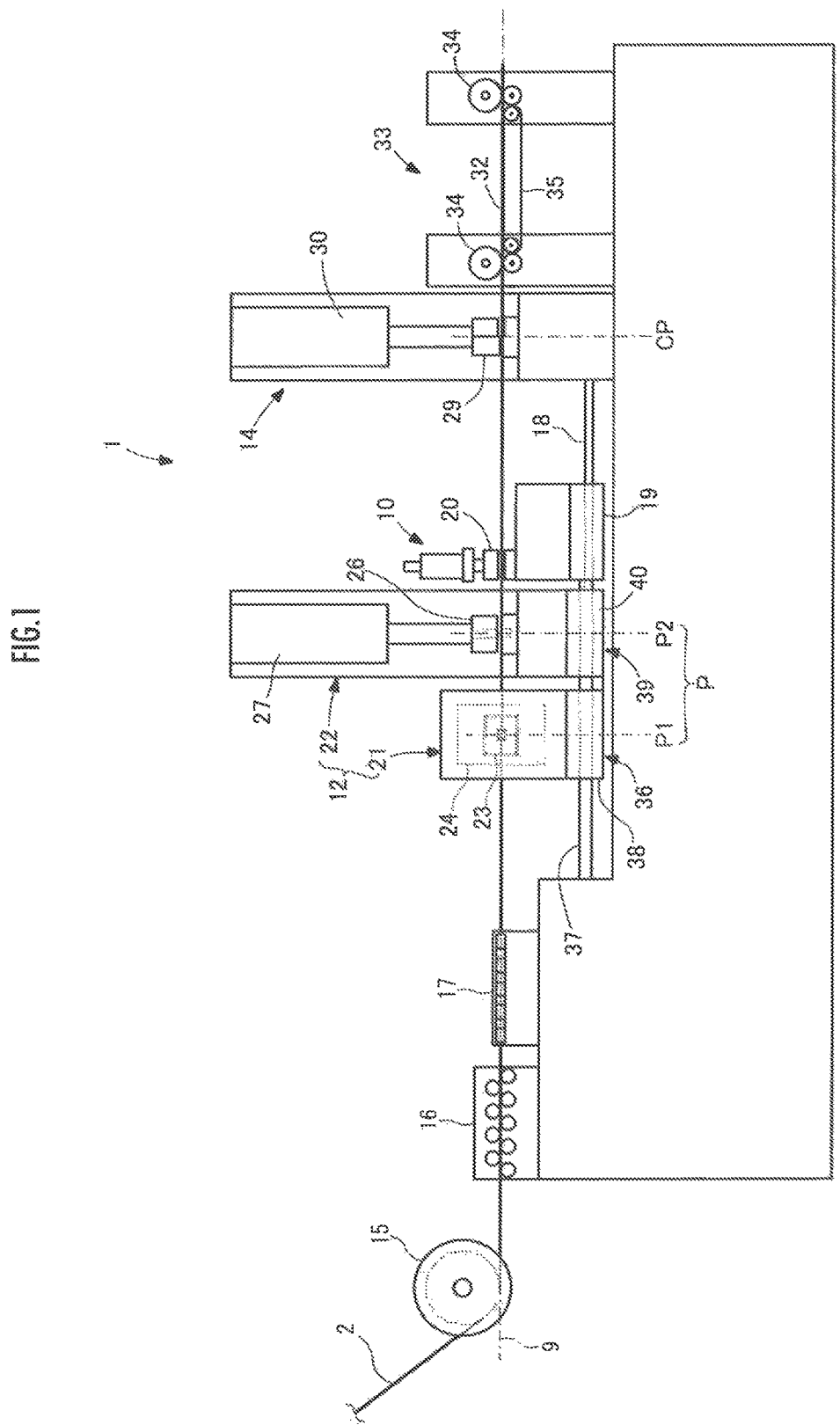
FIG. 1 is a side view illustrating major constituent elements of a coil segment manufacturing apparatus according to an embodiment of the present invention.

The following will describe an embodiment of the present invention with reference to the accompanying drawings. As illustrated in FIG. 1, a coil segment manufacturing apparatus 1 according to the present embodiment is used to manufacture coil segments, which have a plurality of different lengths and the insulation coatings of both ends of which have been removed, from a conducting wire material 2 for coil that is provided with an insulation coating.

Figure 2:
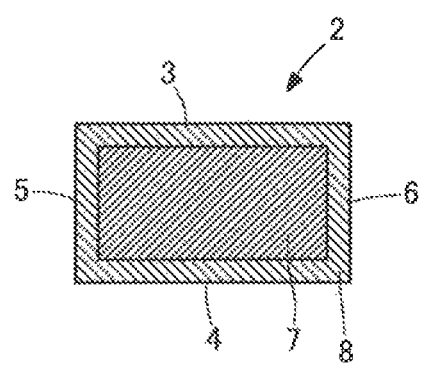
FIG. 2 is a cross sectional view illustrating a conducting wire material supplied to the coil segment manufacturing apparatus in FIG. 1.

As the conducting wire material 2, a rectangular wire is used. More specifically, the cross section of the conducting wire material 2 has a rectangular shape, as illustrated in FIG. 2. The conducting wire material 2 has a first side surface 3 and a second side surface 4 corresponding to each long sides of the rectangle and a third side surface 5 and a fourth side surface 6 corresponding to each short sides of the rectangle. The conducting wire material 2 is constituted of a conductive section 7 made of copper or the like and an insulation coating 8 covering the surrounding of the conductive section 7.

The coil segments manufactured from the conducting wire material 2 have four different lengths. The coil segments 2 of the four different lengths are bundled in a subsequent process such that each bundle contains four coil segments, each of which has a different length. Then, each bundle is formed to be used for constituting a stator coil.

As illustrated in FIG. 1, the coil segment manufacturing apparatus 1 has a conducting wire material feeder 10 that feeds the conducting wire material 2 along a feeding route 9, a coating remover 12 that removes an insulation coating 8 from the conducting wire material 2 at a removal position P on the feeding route 9, and a conducting wire material cutter 14 that cuts the conducting wire material 2 at a cutting position CP on the feeding route 9. The conducting wire material 2 is supplied from a conducting wire material winder (not illustrated) to the coil segment manufacturing apparatus 1 and introduced onto the feeding route 9 through a roller 15.

A thickness-direction corrector 16 and a width-direction corrector 17, which correctively straighten the conducting wire material 2 that has been introduced, are provided between the roller 15 and the coating remover 12. The thickness-direction corrector 16 corrects the conducting wire material 2, which has been introduced, in the thickness direction, while the width-direction corrector 17 corrects the conducting wire material 2, which has been introduced, in the width direction.

The conducting wire material feeder 10 has a traveling stage 19, which is run by a linear motor on a rail 18 along the feeding route 9, and a clamp unit 20, which is provided on the traveling stage 19 and clamps/unclamps the conducting wire material 2. The conducting wire material feeder 10 repeats an operation for clamping the conducting wire material 2, moving the traveling stage 19 by a predetermined feeding amount in a downstream direction of the feeding route 9, unclamping the conducting wire material 2 and then returning the traveling stage 19 in an upstream direction thereof, thereby feeding the conducting wire material 2 in the downstream direction.

While the feeding operation by the conducting wire material feeder 10 is repeated, the feeding amount of the conducting wire material 2 is changed. The feeding amount is changed among four different feeding amounts corresponding to the four different lengths of the coil segments to be fabricated. A predetermined processing time T is provided between the feeding operations.

The coating remover 12 has a first remover 21 that removes the insulation coating 8 from the first side surface 3 and the second side surface 4 of the conducting wire material 2 that has been correctively straightened (refer to FIG. 2) and a second remover 22 that removes the insulation coating 8 from the third side surface 5 and the fourth side surface 6.

Figure 3A:
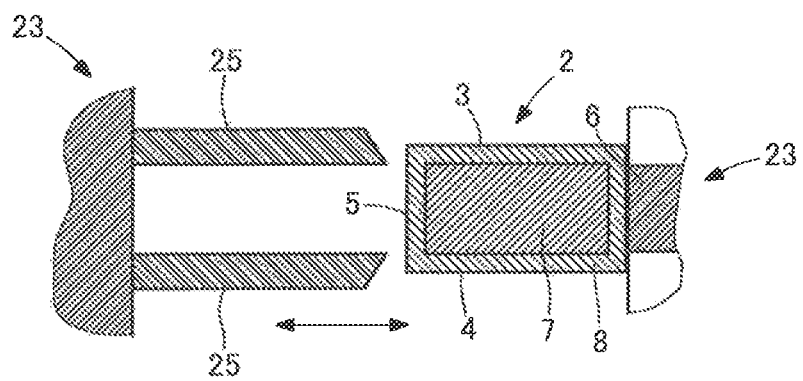
FIG. 3A is a diagram illustrating how an insulation coating is removed by a first remover of the coil segment manufacturing apparatus in FIG. 1.

The first remover 21 has a removing mold 23 for cutting off and removing the insulation coating 8 of the conducting wire material 2 and a mold driver 24, which drives the removing mold 23. The removing mold 23 has two removing blades 25, as illustrated in FIG. 3A. The mold driver 24 moves the removing blades 25 along the first side surface 3 and the second side surface 4 of the conducting wire material 2 to cut and remove the insulation coating 8 from the corresponding portions on the first side surface 3 and the second side surface 4.

Figure 3B:
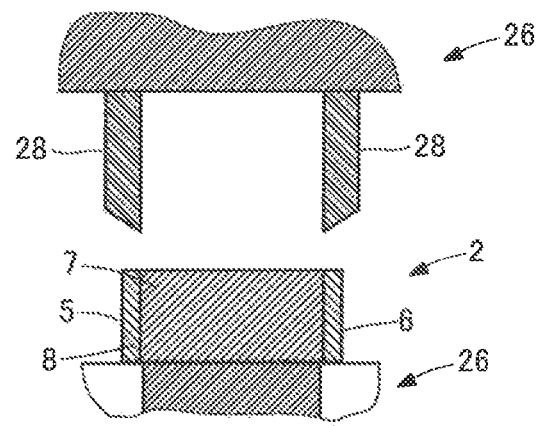
FIG. 3B is a diagram illustrating how an insulation coating is removed by a second remover of the coil segment manufacturing apparatus in FIG. 1.

The second remover 22 has a removing mold 26 for cutting off and removing the insulation coating 8 and a mold driver 27, which drives the removing mold 26. The removing mold 26 has two removing blades 28, as illustrated in FIG. 3B. The mold driver 27 moves the two removing blades 28 along the third side surface 5 and the fourth side surface 6 of the conducting wire material 2 to cut and remove the insulation coating 8 from the corresponding portions on the third side surface 5 and the fourth side surface 6.

The conducting wire material cutter 14 has a cutting mold 29, which cuts the conducting wire material 2, and a mold driver 30, which drives the cutting mold 29. The mold driver 30 drives the cutting mold 29 to cut the conducting wire material 2 sequentially fed by the conducting wire material feeder 10.

The foregoing removal position P at which the insulation coating 8 is removed includes a first removal position P1 and a second removal position P2 on a downstream side relative to the first removal position P1. The removal of the insulation coating 8 by the first remover 21 is carried out at the first removal position P1 within the processing time T each time the processing time T is reached. The removal of the insulation coating by the second remover 22 is carried out at the second removal position P2 within the processing time T each time the processing time T is reached.

As will be discussed hereinafter, the removal of the insulation coating 8 at the first removal position P1 is carried out within the processing time T and then the removal of the insulation coating 8 at the second removal position P2 is carried out within the next processing time T. By the removal processing in the both processing times T, the insulation coating 8 of the first to the fourth side surfaces 3 to 6 at the same portion in the direction of the length of the conducting wire materials 2 is removed.

The conducting wire material 2 is cut by the conducting wire material cutter 14 at the cutting position CP, which is on the downstream side relative to the first removal position P1 and the second removal position P2, within the processing time T each time the processing time T is reached. A transfer unit 33 which transfers the portions cut and separated from the conducting wire materials 2 to the next step as a coil segment 32 is provided on the downstream side relative to the conducting wire material cutter 14. The transfer unit 33 is constituted of a transfer roller 34 and a conveyor 35.

The first remover 21 is provided with a first removal position changer 36 that changes the foregoing first removal position P1 in synchronization with the change of the feeding amount in the conducting wire material feeder 10. The first removal position changer 36 has a first stage 38 slidably provided on a rail 37. The first stage 38, which supports the first remover 21, is driven by a linear motor (not illustrated) to travel on the rail 37 to change the first removal position P1.

As the means for moving the first stage 38 on the rail 37, a ball screw and a servo motor that rotates the nut or the threaded shaft of the ball screw may be used in place of the linear motor.

The second remover 22 is provided with a second removal position changer 39 that changes the foregoing second removal position P2 in synchronization with the change of the feeding amount in the conducting wire material feeder 10. The second removal position changer 39 is constituted of a second stage 40 slidably provided on the rail 37. The second stage 40, which supports the second remover 22, is driven by a linear motor (not illustrated) to travel on the rail 37 to change the second removal position P2.

The first removal position P1 and the second removal position P2 are changed by the following change amount and at the following timing such that the conducting wire material 2 is cut at the cutting position CP at the center of the portion in which the insulation coating 8 has been removed.

FIG. 4 illustrates the conducting wire material 2 and the first removal position P1 (P1a to P1d) and the second removal position P2 (P2a to P2d), which are changed in synchronization with the change of the amount of feed of the conducting wire material 2 by the conducting wire material feeder 10. As illustrated in FIG. 4A to FIG. 4D, in order to manufacture coil segments 32 (32a to 32d) having four different lengths La to Ld, the conducting wire material 2 is repeatedly fed to the cutting position CP by feeding amounts fa to fd in this order, which correspond to the lengths La to Ld.

For each feeding cycle, the insulation coating 8 is removed by the first remover 21 and the second remover 22 and the conducting wire material 2 is cut by the conducting wire material cutter 14 within the processing time T. In FIG. 4A to FIG. 4D, the proportions of the feeding amounts fa to fd are exaggeratedly illustrated. For example, the actual feeding amount fa (the length La of the coil segment 32a) is approximately 280 mm. The feeding amounts fa to fd have values that decrease by, for example, 2 mm, in this order.

More specifically, FIG. 4A illustrates the first removal position P1a and the second removal position P2a at the processing time T immediately after the conducting wire material 2 has been fed by the feeding amount fd. The second removal position P2a indicates a position that is apart from the cutting position CP by the feeding amount fa for the next feed. The first removal position P1a indicates a position that is further apart by the feeding amount fb for the subsequent feed.

In the state illustrated in FIG. 4A, the insulation coating 8 is removed by the first remover 21 at the first removal position P1a within the processing time T. At the same time, the insulation coating 8 is removed by the second remover 22 at the second removal position P2a.

The portion of the conducting wire material 2, the insulation coating 8 of which is removed by the second remover 22, is the portion having the insulation coating 8 thereof already removed by the first remover 21 at the first removal position P1d in FIG. 4D, which will be discussed hereinafter. Hence, when the removal by the second remover 22 is completed, the insulation coating 8 of the portion will have been completely removed from all the first to the fourth side surfaces 3 to 6 (refer to FIG. 2).

Further, concurrently with the removal of the insulation coating 8 at the first removal position P1a and the second removal position P2a, the conducting wire material 2 is cut by the conducting wire material cutter 14. Thus, the coil segment 32d is formed, which has the length Ld corresponding to the feeding amount fd in the feed of the conducting wire material 2 immediately before the state illustrated in FIG. 4A is reached.

FIG. 4B illustrates the first removal position P1b and the second removal position P2b at the processing time T immediately after the conducting wire material 2 has been fed by the feeding amount fa from the state illustrated in FIG. 4A. The second removal position P2b indicates a position that is apart from the cutting position CP by the feeding amount fb for the next feed. The first removal position P1b indicates a position that is further apart by the feeding amount fc for the subsequent feed.

In the state illustrated in FIG. 4B, the insulation coating 8 is removed by the first remover 21 at the first removal position P1b within the processing time T. At the same time, the insulation coating 8 is removed by the second remover 22 at the second removal position P2b.

The portion of the conducting wire material 2, the insulation coating 8 of which is removed by the second remover 22 is the portion having the insulation coating 8 thereof already removed at the first removal position P1a in the state of FIG. 4A. Hence, when the removal by the second remover 22 is completed, the insulation coating 8 of the portion of the conducting wire material 2 will have been completely removed from all the first to the fourth side surfaces 3 to 6.

Further, concurrently with the removal of the insulation coating 8 at the first removal position P1b and the second removal position P2b, the conducting wire material 2 is cut by the conducting wire material cutter 14. Thus, the coil segment 32a is formed, which has the length La corresponding to the feeding amount fa in the feed of the conducting wire material 2 when the state of FIG. 4A is changed to the state of FIG. 4B.

FIG. 4C illustrates the first removal position P1c and the second removal position P2c at the processing time T immediately after the conducting wire material 2 has been fed by the feeding amount fb from the state illustrated in FIG. 4B. The second removal position P2c indicates a position that is apart from the cutting position CP by the feeding amount fc for the next feed. The first removal position P1c indicates a position that is further apart by the feeding amount fd for the subsequent feed.

In the state illustrated in FIG. 4C, the insulation coating 8 is removed by the first remover 21 at the first removal position P1c within the processing time T. At the same time, the insulation coating 8 is removed by the second remover 22 at the second removal position P2c.

The portion of the conducting wire material 2, the insulation coating 8 of which is removed by the second remover 22 is the portion having the insulation coating 8 thereof already removed at the first removal position P1b in the state of FIG. 4B. Hence, when the removal by the second remover 22 is completed, the insulation coating 8 of the portion of the conducting wire material 2 will have been completely removed from all the first to the fourth side surfaces 3 to 6.

Further, concurrently with the removal of the insulation coating 8 at the first removal position P1c and the second removal position P2c, the conducting wire material 2 is cut by the conducting wire material cutter 14. Thus, the coil segment 32b is formed, which has the length Lb corresponding to the feeding amount fb in the feed of the conducting wire material 2 when the state of FIG. 4B is changed to the state of FIG. 4C.

FIG. 4D illustrates the first removal position P1d and the second removal position P2d at the processing time T immediately after the conducting wire material 2 has been fed by the feeding amount fc from the state illustrated in FIG. 4C. The second removal position P2d indicates a position that is apart from the cutting position CP by the feeding amount fd for the next feed. The first removal position P1d indicates a position that is further apart by the feeding amount fa for the subsequent feed.

In the state illustrated in FIG. 4D, the insulation coating 8 is removed by the first remover 21 at the first removal position P1d within the processing time T. At the same time, the insulation coating 8 is removed by the second remover 22 at the second removal position P2d.

The portion of the conducting wire material 2, the insulation coating 8 of which is removed by the second remover 22 is the portion having the insulation coating 8 thereof already removed at the first removal position P1c in the state of FIG. 4C. Hence, when the removal by the second remover 22 is completed, the insulation coating 8 of the portion of the conducting wire material 2 will have been completely removed from all the first to the fourth side surfaces 3 to 6.

Further, concurrently with the removal of the insulation coating 8 at the first removal position P1d and the second removal position P2d, the conducting wire material 2 is cut by the conducting wire material cutter 14. Thus, the coil segment 32c is formed, which has the length Lc corresponding to the feeding amount fc in the feed of the conducting wire material 2 when the state of FIG. 4C is changed to the state of FIG. 4D.

As described above, the coil segment manufacturing apparatus 1 manufactures the coil segments 32a to 32d, which have the insulation coatings 8 of both ends of which have been removed and which have the four different lengths La to Ld, from the conducting wire material 2 provided with the insulation coating 8. At this time, as illustrated in FIG. 5, the feeding step (step S1), the removal step (step S2), the cutting step (step S3), and the removal position changing step (step S4) are repeatedly carried out.

Specifically, in the feeding step (step S1), the feeding operation for feeding the conducting wire material 2 along the feeding route 9 is performed as described above. The feeding operation, during which the feeding amount is changed among the four different feeding amounts fa to fd corresponding to the four different lengths La to Ld is repeated, with the processing time T being interposed between the feeding operations, until the end of the manufacture is determined in step S5.

In the removal step (step S2), each time the feeding step (step S1) is carried out, the insulation coating 8 of the conducting wire material 2 is removed within the corresponding processing time T at the removal positions (the first removal position P1a to P1d and the second removal position P2a to P2d) on the feeding route 9 corresponding to the feeding amount fa, fb, fc or fd related to the particular feeding operation. The removal step includes a first removal step for removing the insulation coating 8 of the first side surface 3 and the second side surface 4 and a second removal step for removing the insulation coating 8 of the third side surface 5 and the fourth side surface 6.

In the cutting step (step S3), each time the processing time T is reached, the portion having the insulation coating 8 removed therefrom by the removal step is cut at the cutting position CP within the processing time T concurrently with the foregoing removal step.

In the removal position changing step (step S4), the foregoing removal positions (the first removal position P1 and the second removal position P2) are changed in synchronization with the change of the feeding amounts fa to fd. The removal positions are changed among the first removal positions P1a to P1d for the first removal position P1 and among the second removal positions P2a to P2d for the second removal position P2 such that the insulation coating 8 is removed at the portion where the conducting wire material 2 is cut.

According to the present embodiment, the first removal position P1 and the second removal position P2 are changed in synchronization with the change among the feeding amounts fa to fd of the conducting wire material 2 such that the insulation coating 8 is removed at the portion that includes the position at which the conducting wire material 2 is cut. Further, the removal of the insulation coating 8 and the cutting of the conducting wire material 2 are concurrently carried out within the processing time T. This makes it possible to efficiently manufacture the coil segments 32a to 32d of the four different lengths La to Ld by a simple apparatus construction.

To remove the insulation coating 8 of the conducting wire material 2, the insulation coating 8 on the first side surface 3 and the second side surface 4 is removed at the first removal position P1 by the first remover 21, while the insulation coating 8 on the third side surface 5 and the fourth side surface 6 is removed at the second removal position P2 by the second remover 22. Hence, the insulation coating 8 of the conducting wire material 2, which is a rectangular wire, can be removed by a simple construction.

The present invention is not limited to the embodiment described above. For example, the number of the different lengths of the coil segments to be manufactured is not limited to four. Further, the insulation coating 8 may be removed at one or three or more removal positions. Further, the conducting wire material 2 is not limited to the rectangular wire, but may have a round cross section.

What is claimed is:

1. A coil segment manufacturing apparatus for manufacturing coil segments in which insulation coatings of both ends have been removed and which have a plurality of different lengths, from a coil conducting wire material provided with an insulation coating, comprising:
    a conducting wire material feeder which feeds the conducting wire material along a feeding route by a plurality of different feeding amounts corresponding to the plurality of different lengths;
    a coating remover which removes the insulation coating of the conducting wire material at a removal position on the feeding route; and
    a conducting wire material cutter which cuts the conducting wire material at a predetermined cutting position on the feeding route;
    wherein
    the coating remover is configured to change the removal position according to the feeding amounts,
    the conducting wire material feeder repeats a feeding operation to feed the conducting wire material by interposing a predetermined processing time,
    the coating remover and the conducting wire material cutter perform the removal and the cutting respectively, within the predetermined processing time,
    the conducting wire material has four side surfaces including a first side surface to a fourth side surface,
    the coating remover comprises:
        a first remover which removes the insulation coating of the first side surface of the conducting wire material and the second side surface thereof which is an opposite side of the first side surface, at a first removal position; and
        a second remover which removes, at a second removal position, the insulation coating of the third side surface and the fourth side surface at a same portion as the portion of the conducting wire material, at which the insulation coating have been removed by the first remover, and the first remover and the second remover perform the removing within the predetermined processing time.

2. The coil segment manufacturing apparatus according to claim 1, wherein the coating remover is configured to change the removal position at a feeding time when the conducting wire material feeder is feeding the conductive wire material.

3. A coil segment manufacturing apparatus for manufacturing coil segments in which insulation coatings of both ends have been removed and which have a plurality of different lengths, from a coil conducting wire material provided with an insulation coating, comprising:

a conducting wire material feeder which feeds the conducting wire material along a feeding route by a plurality of different feeding amounts corresponding to the plurality of different lengths;

a coating remover which removes the insulation coating of the conducting wire material at a removal position on the feeding route; and a conducting wire material cutter which cuts the conducting wire material at a predetermined cutting position on the feeding route;

wherein the coating remover is configured to change the removal position according to the feeding amounts, the conducting wire material has four side surfaces including a first side surface to a fourth side surface, the coating remover comprises:

a first remover which removes the insulation coating of the first side surface of the conducting wire material and the second side surface thereof which is an opposite side of the first side surface, at a first removal position; and a second remover which removes, at a second removal position, the insulation coating of the third side surface and the fourth side surface at a same portion as the portion of the conducting wire material, at which the insulation coating have been removed by the first remover, and the first remover and the second remover move on a common rail.

4. The coil segment manufacturing apparatus according to claim 3, wherein the coating remover is configured to change the removal position at a feeding time when the conducting wire material feeder is feeding the conductive wire material.

\* \* \* \* \*